US007945802B2

(12) United States Patent
Hamilton, II et al.

(10) Patent No.: US 7,945,802 B2
(45) Date of Patent: May 17, 2011

(54) MODIFYING TIME PROGRESSION RATES IN A VIRTUAL UNIVERSE

(75) Inventors: Rick A. Hamilton, II, Charlottesville, VA (US); Paul A. Moskowitz, Yorktown Heights, NY (US); Brian M. O'Connell, Cary, NC (US); Clifford A. Pickover, Yorktown Heights, NY (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 11/856,526

(22) Filed: Sep. 17, 2007

(65) Prior Publication Data

US 2009/0077161 A1 Mar. 19, 2009

(51) Int. Cl.
*G06F 1/00* (2006.01)
*G06F 19/00* (2006.01)
(52) U.S. Cl. ............ 713/500; 345/691; 463/30; 463/31; 463/32
(58) Field of Classification Search .......... 713/500; 345/691; 463/30, 31, 32
See application file for complete search history.

(56) References Cited

U.S. PATENT DOCUMENTS

| 6,672,961 | B1 | 1/2004 | Uzun |
| 6,826,523 | B1 | 11/2004 | Guy et al. |
| 7,517,282 | B1 * | 4/2009 | Pryor ............................ 463/42 |
| 2003/0084094 | A1 * | 5/2003 | Shim et al. .................... 709/203 |
| 2003/0190951 | A1 * | 10/2003 | Matsumoto .................... 463/30 |
| 2004/0059436 | A1 * | 3/2004 | Anderson et al. ................. 700/2 |
| 2006/0094501 | A1 * | 5/2006 | O'Leary et al. .................. 463/30 |
| 2008/0070684 | A1 * | 3/2008 | Haigh-Hutchinson ......... 463/32 |
| 2008/0207327 | A1 * | 8/2008 | Van Luchene et al. ......... 463/42 |

FOREIGN PATENT DOCUMENTS

EP 1852829 A1 11/2007

OTHER PUBLICATIONS

PCT Notification of Transmittal of the International Search Report and the Written Opinion of the International Searching Authority, or the Declaration dated Mar. 23, 2009.
Bares, William H., et al., "Habitable 3D Learning Environments for Situated Learning", *ITS-98: Proceedings of the Fourth International Conference on Intelligent Tutoring Systems*, San Antonio, Texas, (1998),76-85.
Bares, William H., "Realtime Generation of Customized 3D Animated Explanations for Knowledge-Based Learning Environments", *AAAI-97: Proceedings of the Fourteenth National Conference on Artificial Intelligence*, Providence,Rhode Island, (1997),347-354.

* cited by examiner

*Primary Examiner* — Vincent T Tran
(74) *Attorney, Agent, or Firm* — DeLizio Gilliam, PLLC

(57) ABSTRACT

Described herein are processes and devices that intentionally modify time progression rates in a virtual universe. One of the devices described is a temporal variation device. The temporal variation device can determine an area, in a virtual universe, in which time progresses at a specific time progression rate. The temporal variation device can modify the time progression rate to be faster or slower in the area. By modifying the time progression rate in the area, rates at which action occur also change in a way that is correlated to the change in the time progression rate. The temporal variation device can maintain areas beyond the borders of the area at a time progression rate that is not modified. Therefore, the temporal variation device can create a relative time dilation between the determined area and other areas in the virtual universe outside of the determined area.

25 Claims, 11 Drawing Sheets

US 7,945,802 B2

MODIFYING TIME PROGRESSION RATES IN A VIRTUAL UNIVERSE

FIELD

Embodiments of the inventive subject matter relate generally to virtual universes, systems, and networks, and more particularly to modifying time progression rates in a virtual universe.

BACKGROUND

Virtual universe applications allow people to socialize and interact in a virtual universe. A virtual universe ("VU") is a computer-based simulated environment intended for its residents to traverse, inhabit, and interact through the use of avatars. Many VUs are represented using 3-D graphics and landscapes, and are populated by many thousands of users, known as "residents." Other terms for VUs include metaverses and "3D Internet."

SUMMARY

Described herein are processes and devices that intentionally modify time progression rates in a virtual universe. One of the devices described is a temporal variation device. The temporal variation device can determine an area, in a virtual universe, in which time progresses at a specific time progression rate. The temporal variation device can modify the time progression rate to be faster or slower in the area. By modifying the time progression rate n the area, rates at which action occur also change in a way that is correlated to the change in the time progression rate. The temporal variation device can maintain areas beyond the borders of the area at a time progression rate that is not modified. Therefore, the temporal variation device can create a relative lime dilation between the determined area and other areas in the virtual universe outside of the determined area.

BRIEF DESCRIPTION OF THE FIGURES

Embodiments are illustrated in the Figures of the accompanying drawings.

DESCRIPTION OF THE EMBODIMENTS

The description that follows includes exemplary systems, methods, techniques instruction sequences and computer program products that embody techniques of embodiments of the present invention. However, it is understood that the embodiments of the described invention may be practiced without these specific details. In some instances, well-known instruction instances, protocols, structures and techniques have not been shown in detail in order not to obfuscate the description.

Introduction

In a virtual universe, users Carl control avatars and other objects according to a pre-determined set of physical rules. Those rules apply the physical formulas and variables that control the movements, scripts, actions, and other activities of the avatars and objects in the virtual universe. The passage of time is one of those pre-determined rules. Generally, time progresses in one part of the virtual universe similar to other parts of the virtual universe so that all objects and characters experience time at a consistent rate.

Figure 1:
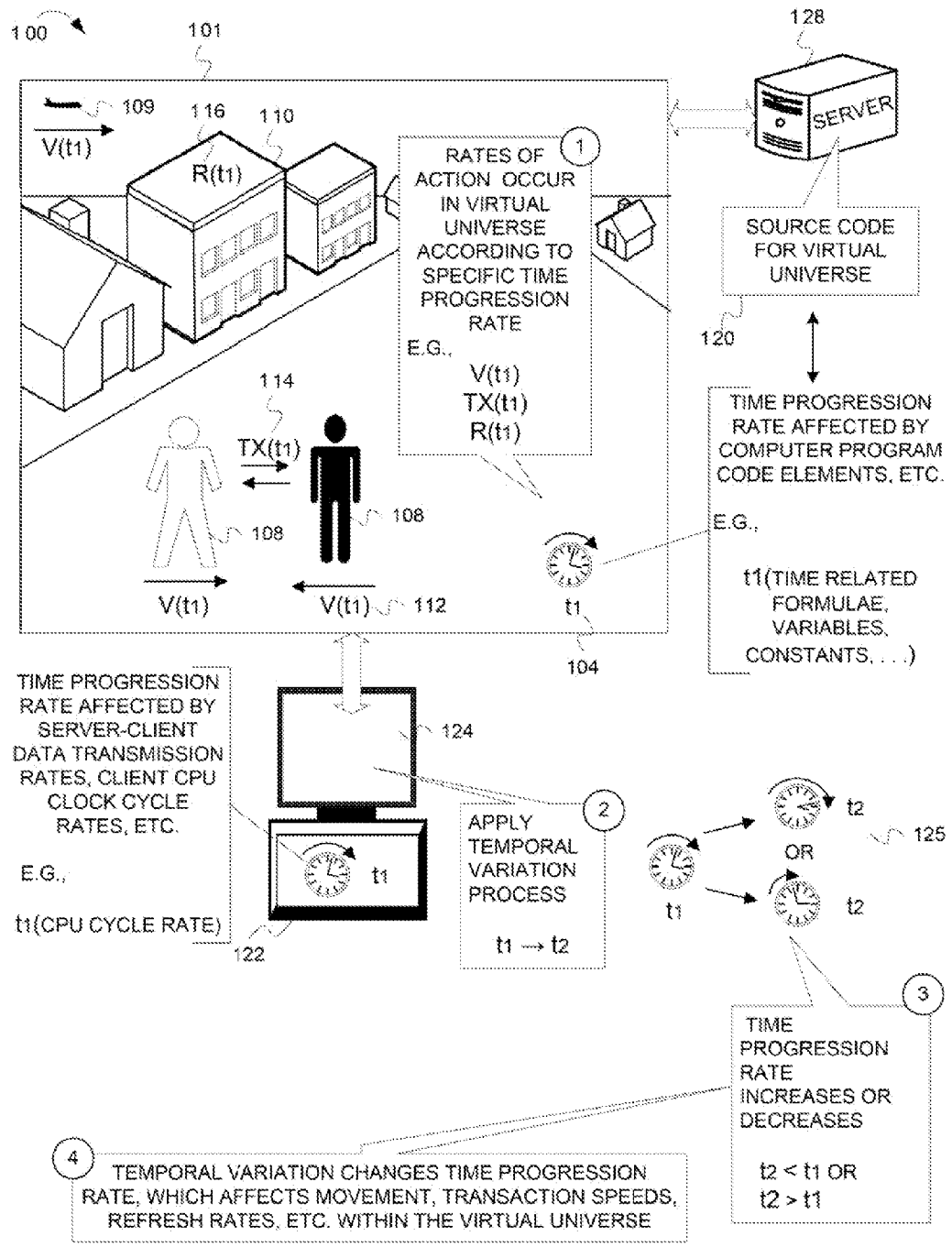
FIG. 1 is an illustration of example temporal variation within a virtual universe.

Causing regions in the virtual universe to run at different time scales, however, allows various issues (e.g., network and use issues) to be addressed. This difference in time scales is more succinctly referred to, herein, as temporal variation. Temporal variation between regions and objects in the virtual universe can help administrators to respond to mischievous users, instability, and other issues often encountered in a virtual universe. Temporal variation can also help users, especially inexperienced users, to slow actions that otherwise might be too quick to control. FIG. 1 shows how some devices, according to some embodiments, can work to cause temporal variation in a virtual universe.

FIG. 1 is an illustration of example temporal variation within a virtual universe, according to some embodiments of the invention. In FIG. 1, an operating environment 100 includes a server device ("server") 128 and a client device ("client") 122. The server 128 includes code 120 (e.g., source code, object code, machine code, executable files, libraries, scripts, etc.) that is used to present and manage a virtual universe 101. The client 122 can be utilized to view the virtual universe 101 and to control avatars 108 within the virtual universe 101. The virtual universe 101 includes various objects, including avatars 108, buildings 110, vehicles 109, etc. In the virtual universe 101, at stage "1", objects can perform actions according to a first time progression rate 104 (t1). The first time progression rate 104 affects the rate of actions in the virtual universe 101. Rates of action can include rates of movement 112 of objects (e.g., V(t1)), rates of transactions 114 between objects (TX(t1)), refresh rates 116 of object appearances (R(t1)), etc. The first time progression rate 104 can be determined and affected by computer program code elements, such as time related formulae, variables, and constants. The first time progression rate 104 can also be affected by server and client processing, such as data transmission rates, data throttling, and clock cycle rates.

In stage "2", a system device (e.g., client 122, server 128, etc.) configured according to some embodiments, applies a temporal variation process. The temporal variation process can cause the first time progression rate to change to a second, distinctly different, time progression rate. Stage "3" demonstrates this process by changing the first time progression rate 104 to a second time progression rate 125. The second time progression rate 125 is increased or decreased. In stage "4", the second time progression rate 125 is applied to the virtual universe 101, which causes the rates of action in the virtual universe to proportionately change. For example, the rate of movement 112 can increase or decrease in reaction to the change in time progression rates. Transactions rates, graphic refresh rates, etc. can also increase or decrease in reaction to the change in time progression rates

EXAMPLE OPERATING ENVIRONMENTS

This section describes example operating environments and networks and presents structural aspects of some embodiments. More specifically, this section includes discussion about temporal variation device operating environments, temporal variation device architectures, and temporal variation device operating environments.

Figure 2:
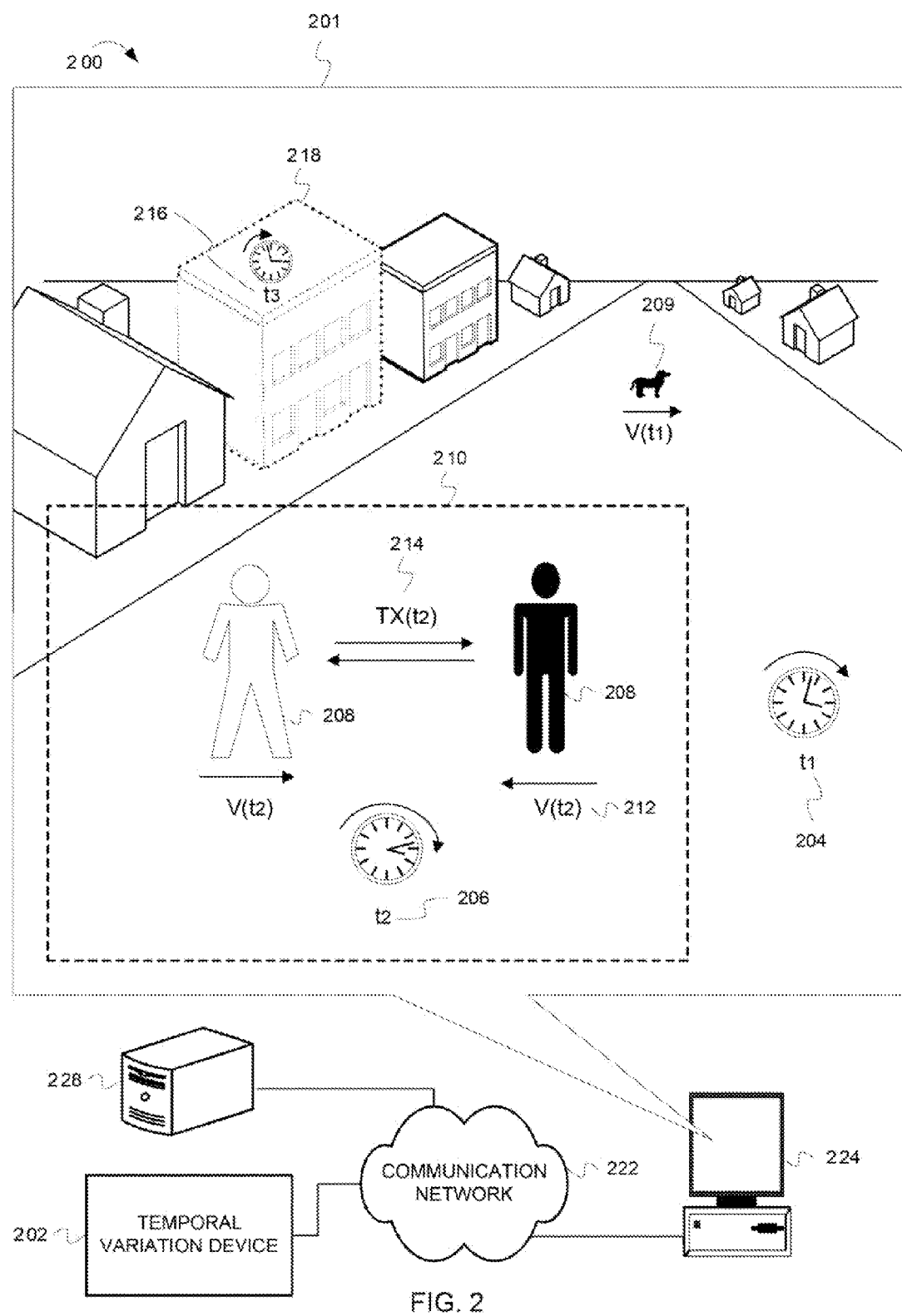
FIG. 2 is an illustration of an example temporal variation device 202 in an operating environment 200.

Example of Modifying and Controlling Time Progression Rates in a Virtual Universe FIG. 2 is an illustration of an example temporal variation device 202 in an operating environment 200. In FIG. 2, the temporal variation device 202 is connected to a communication network 222 in the operating environment 200. A server 228 and a client 224 are also connected to the communication network 222. The temporal variation device 202, in some embodiments, can be contained in the server 228 and the clients 224, 225, 226, individually or separately. Alternatively, in some embodiments, the temporal variation device 202 can be separate from any device shown.

The client 224 displays a virtual universe 201. Actions in the virtual universe can occur at rates correlated to a first time progression rate 204. For example, object 209 moves at a rate of movement (V(t1)) that is a function of the first time progression rate 204. The temporal variation device 202, according to some embodiments, can select an area 210 In the virtual universe 201 and apply a second time progression rate 206. Objects in that area 210, such as avatars 208 are subjected to the second time progression rate 206. Therefore, the rate of movement 212 (V(t2)), becomes a function of tie second time progression rate. Consequently, the rate of movement 212 of the avatars 208 increases or decreases in a correlated way, such as proportionally, to the increase or decrease in the second time progression rate 206 for the area 210. Furthermore, other action rates, like the rate of transaction 214 within area 210 can also change, such as proportionally, to the increase or decrease of the second time progression rate 206. The temporal variation device 202 can also select other areas, such as area 218. The boundaries of the area 218 conform to the boundaries of specific objects, in this case to the boundaries of a building, to which the temporal variation device 202 applies a third time progression rate 216 that is also different from the first time progression rate 204. The third time progression rate 216 can also be different from the second time progression rate 206. Rates of action within the second area 218 would therefore change, such as proportionally, to the third time progression rate 216. The temporal variation device 202 may enable temporal variation in the virtual universe 210 according, a triggering event, such as a manual request by a user to trigger temporal variation, or by an event that occurs within the virtual universe 201.

Example Temporal Variation Device Architecture

Figure 3:
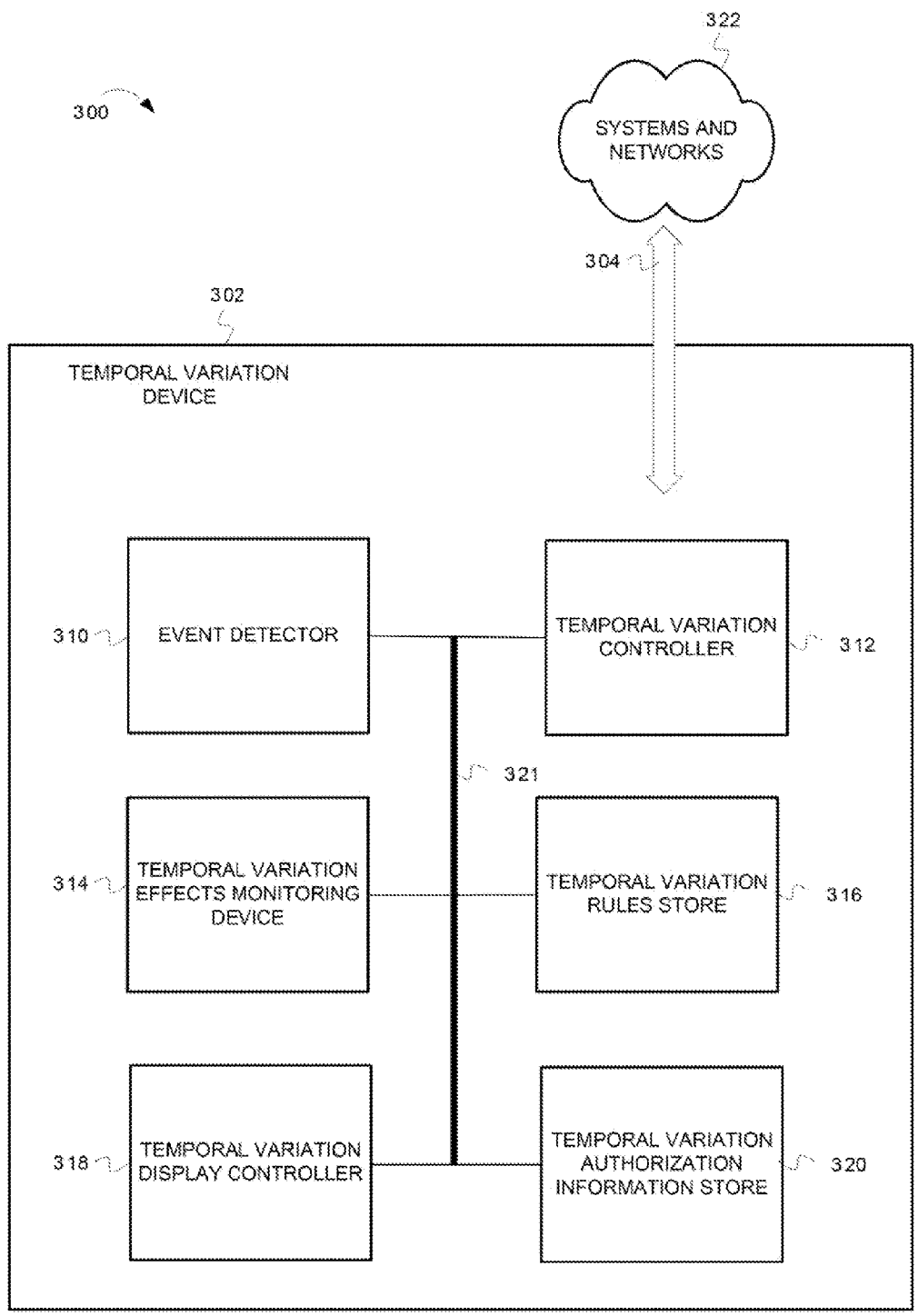
FIG. 3 is an illustration of an example temporal variation device architecture 300.

FIG. 3 is an illustration of an example temporal variation device architecture 300. In FIG. 3, the temporal variation device architecture 300 includes a temporal variation device 302 that can interface, via an external communications interface 304, with external systems and networks 322. The temporal variation device architecture 300 includes an event detector 310 configured to detect events that could trigger temporal variation in a virtual universe.

The temporal variation device architecture 300 also includes a temporal variation controller 312 configured to control temporal variation in a virtual universe. The temporal variation device architecture 300 also includes a temporal variation effects monitoring device 314 configured to monitor the effects of temporal variation on a virtual universe.

Furthermore, the temporal variation device architecture 300 also includes a temporal variation rates store 316 configured to store rules regarding the application of temporal variation to a virtual universe. The temporal variation device architecture 300 also includes a temporal variation display controller 318 configured to indicate areas of a virtual universe that are experiencing temporal variation. The temporal variation device architecture 300 also includes a temporal variation authorization information store 320 configured to store information that can be used to connect to user accounts as well as passwords, user identification accounts names, etc.

Finally, the temporal variation device architecture 300 also includes a communication interface 321 configured to facilitate communication between the components of the temporal variation device 302.

Figure 4:
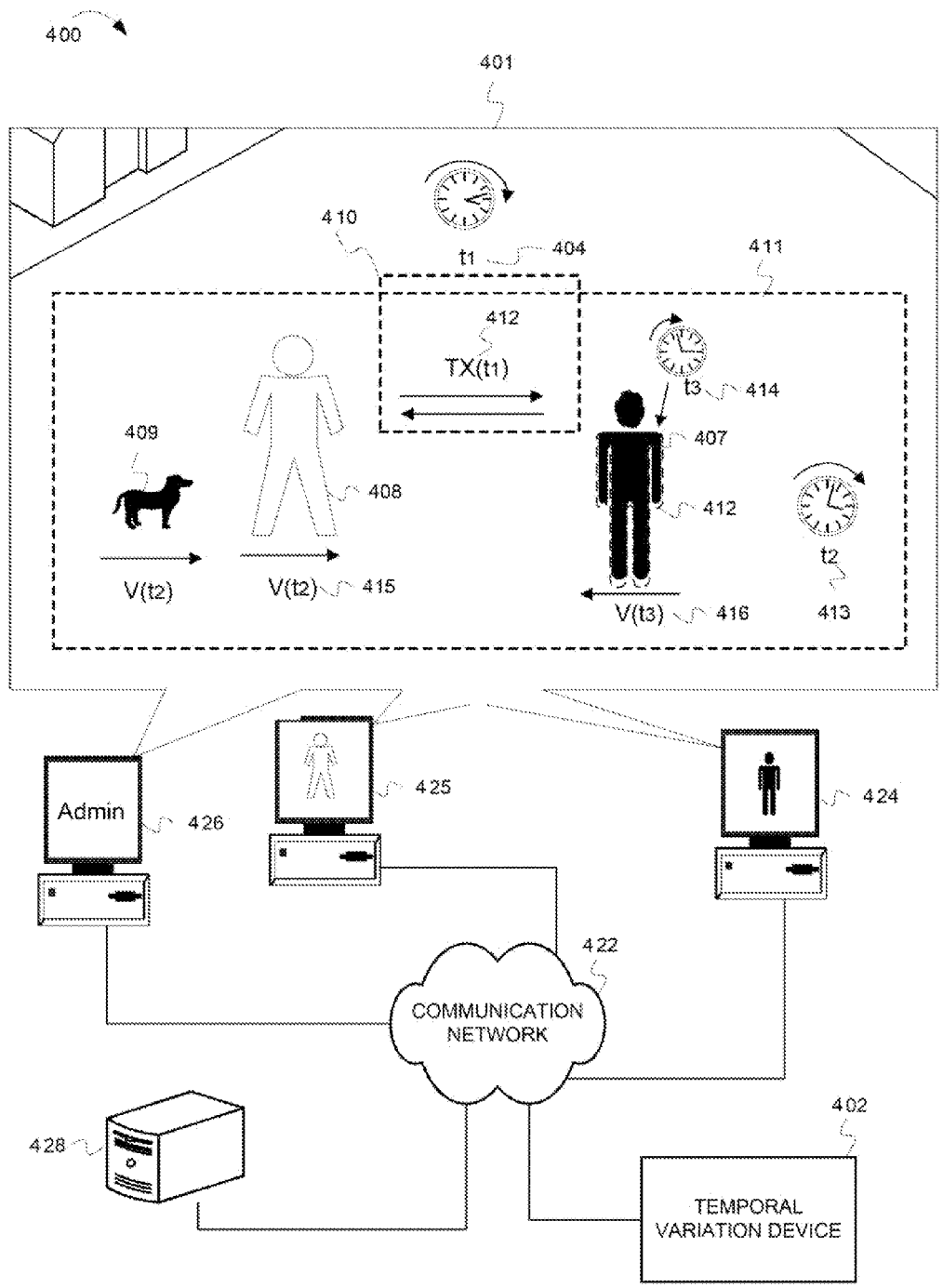
FIG. 4 is an illustration of an example temporal variation device 402 in an operating environment 400.

Example of Modifying and Controlling a Plurality of Time Progression Rates in a Plurality of Areas of a Virtual Universe FIG. 4 is an illustration of an example temporal variation device 402 in an operating environment 400. The operating environment 400 also includes a server 428 and a plurality of clients 424, 425, 426. The server 428, the clients 424, 425, 426, and the temporal variation device 402 are connected to a communication network 422. The temporal variation device 402, in some embodiments, can be contained in the server 428 and the clients 424, 425, 426, individually or separately. Alternatively, in some embodiments, the temporal variation device 402 can be separate from any device shown.

The clients 424, 425, 426 access a virtual universe 401. A first client 424, controls a first avatar 407, a second client 425 controls a second avatar 408, while a third client 426 is configured to monitor and control various aspects of the virtual universe 401 in an administrative role. The temporal variation device 402 selects a plurality of areas 410, 411, 412 in the virtual universe 401, and applies temporal variation to the areas 410, 411, 412 in different ways. For example, the temporal variation device applies a first time progression rate 404 to a first area 411. The boundaries of the first area 410 extend into a second area 411 and encompass objects or items related to a transaction 412, thus causing the transaction 412 to occur at a rate of action correlated to the first time progression rate 404. The temporal variation device 402 applies a second time progression rate 413 to the second area 410, causing objects within the second area 411 to experience rates of action correlated to the second time progression rate 413. For example, the second avatar 408, and the movable object 409, both move at a rate of movement 415 that correlates to the second time progression rate 412. However, although the first avatar 407 is contained within the boundaries of the second area 411, the temporal variation device 402 applies a third time progression rate 413 to a third area 413 contained within the second area 411. The boundaries of the third area 413 extend around the first avatar 407. The first avatar 407, therefore, experiences rates of action correlated to the third time progression rate 414. In other words, the first avatar 407 moves at a different rate of speed than the first avatar 408, or any other objects in the first area 410 or the second area 411 The third client 426, for example, may utilize the temporal variation device 402 in an administrative role to slow down avatars, like the first avatar 407, in relation to any nearby object in the virtual universe 401. When the first avatar 407 is slowed in relation to other objects, then administrators, and other players, have an advantage over an avatar that may be causing problems in the virtual universe. For example, if a rogue user in the system causes one or more avatars, or other objects, to cause mischief, create instability, conduct economic terrorism, or to act inappropriately in the virtual universe. an administrator may require time to understand, isolate, and troubleshoot the problem. Therefore, the administrator may want to temporally dilate, or slow down, the actions of the avatars and objects under the rogue user's control. Thus, the administrator activities, both inside and outside of the virtual universe, can have a relatively higher speed of action in comparison to the speeds of the rogue avatars and objects in the virtual universe. By having a higher speed of action, then the administrator can have more time to block, reverse, or correct rogue activities and other problems.

EXAMPLE OPERATIONS

This section describes operations associated with some embodiments of the invention In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). Moreover, some embodiments can perform less than all the operations shown in any flow diagram.

Figure 5:
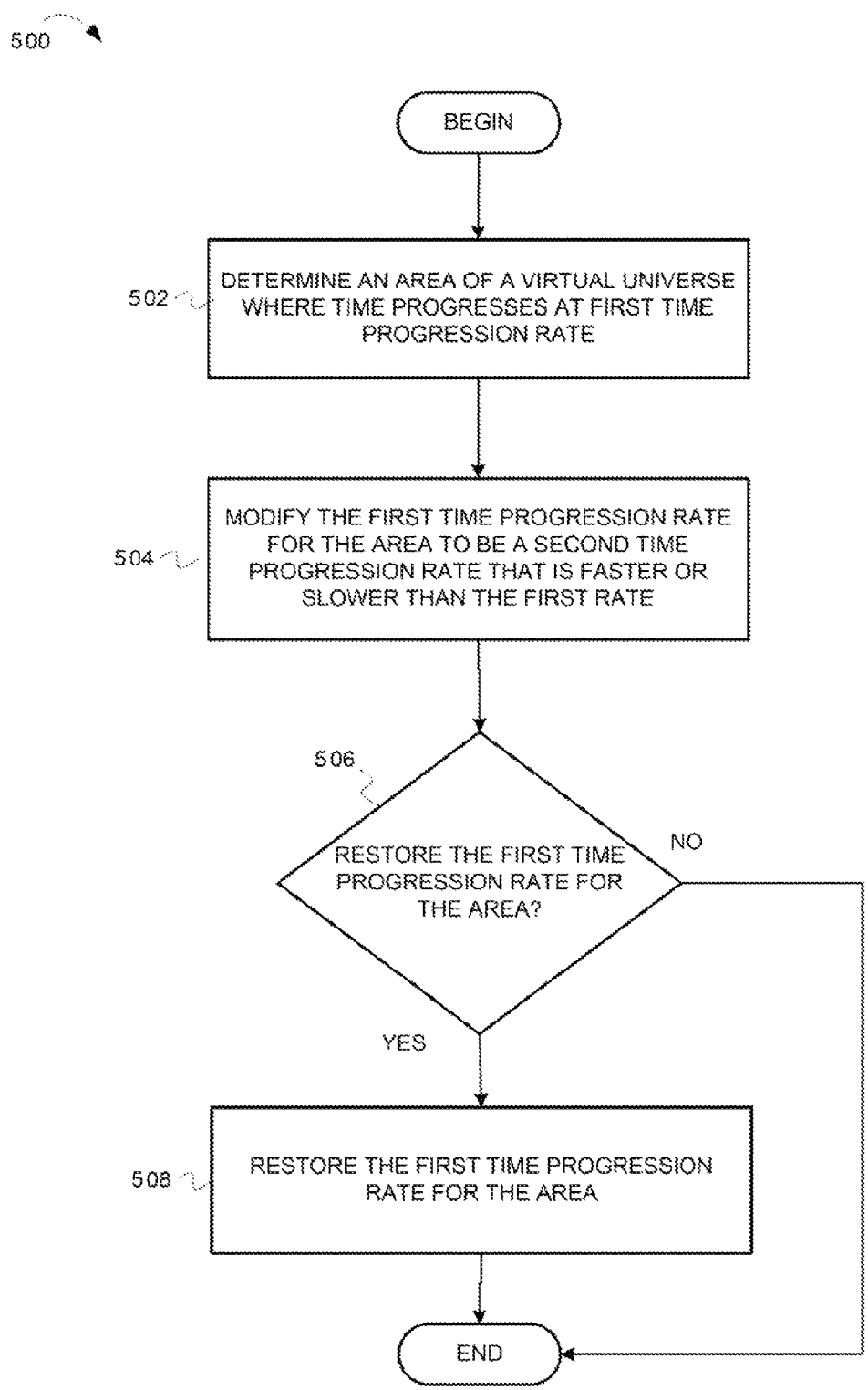
FIG. 5 is an example flow diagram 500 illustrating controlling relative time progression rates in a virtual universe.

FIG. 5 is an example flow diagram illustrating controlling relative time progression rates in a virtual universe. In FIG. 5, the flow 500 begins at processing block 502, where a temporal variation device determines an area of a virtual universe where time progresses at a first time progression rate. The first time progression rate causes actions to occur in the area at one or more rates of action. Those rates of action can occur at "default" rates for the area. For example, one rate of action could be how quickly avatars can move within the area of the virtual universe. In other words, one rate of action could be an avatars "rate of movement". By default, an avatar's rate of movement might be set to a default speed (e.g., traverse one virtual unit of distance per second). The default speed, however, is affected by the rate at which time progresses in the virtual universe. The "per second" portion of the avatar's rate of movement is affected by the time progression rate. If the rate at which time progressed in the area of the virtual universe were to change, then the avatars rate of movement would change as well. In other words, the rate of action that occurs in the area of the virtual universe is correlated to the time progression rate. As the time progression rate changes, then the effects of action and time in the area also change. Examples of rates of actions include rates of movement or speed, graphical pixel refresh rates, transaction rates, etc.

The act of varying time progression rates can be described as "temporal variation" in a virtual universe. In other words, a temporal variation device can change the reference of time in the virtual universe relative to different observers, or actors, in the virtual universe. It can be beneficial to alter the progression of time for some observers and actors and not for others. For this reason, in some embodiments, the temporal variation device determines an "area", or certain space, within the virtual universe, where time progression can be altered. If the temporal variation device only alters a time progression rate in one area, then other actors or observers that are occupying or viewing other areas can continue to function at unaltered rates. In other words, in some embodiments, rates of action are affected only in the determined area.

Area boundaries can be specifically tied to geographical boundaries within a virtual universe, such as to a building, a room, or a town. They can also be tied to an avatar, or to within a certain radius around the avatar. Area boundaries can also be tied to objects or locations where a transaction or event is occurring. For example, the area could be tied only to two avatars that are doing business, to speed up business transactions that are routine. In another example, the area boundaries can be tied to a rogue avatar or any other elements within that avatars control, to significantly slow down malicious activities caused by the rogue avatar. Areas can also extend as pockets or bubbles to different geographical boundaries that are not contiguous. For example if there are two malicious avatars, then the temporal variation device could set the area boundaries to encompass the two avatars, even if they are not in immediate proximity to each other, yet still not encompass objects or items that are between the two rogue avatars. As another example, an area boundary for temporal variation may be defined by coordinates within a virtual universe. An area boundary for temporal variation may even be defined by hardware (e.g., apply temporal variation to a region(s) rendered at a particular client or by a particular one or more servers).

The flow 500 continues at processing block 504, where the temporal variation device modifies the first time progression rate for the area to be a second time progression rate that is different than the first rate. The temporal variation device can modify the first time progression rate for the area, or in other words, speed up or slow down the first time progression rate, thus creating a second time progression rate that applies only to the area. The second time progression rate causes rates of action in the area to change. Actions speed up or slow down as well in a correlated manner. At the same time, the temporal variation device may partition off the area and apply the second time progression rate inside the area while simultaneously applying the first time progression rate in the virtual universe outside of the area. If objects in the virtual universe enter, or are subsumed into or exposed to, that area, then the objects are subjected to the second time progression rate. Likewise, when objects in the virtual universe leave, or are removed from or unexposed to, that area, then they are subjected to the first time progression rate.

The flow 500 continues at processing block 506, where the temporal variation device determines whether to restore the first time progression rate for the area. If not, then the process ends. If so, then the process continues at block 508.

The flow 500 continues at processing block 508, where the temporal variation device restores the first time progression rate for the area. The temporal variation device can restore the first time progression rate, or in other words reverse the modification of the first time progression rate to cause the second time progression rate to return to the first time progression rate. By restoring the first time progression rate, fie temporal variation device causes the one or more rates of action in the area to return to their original rates of action.

Figure 6:
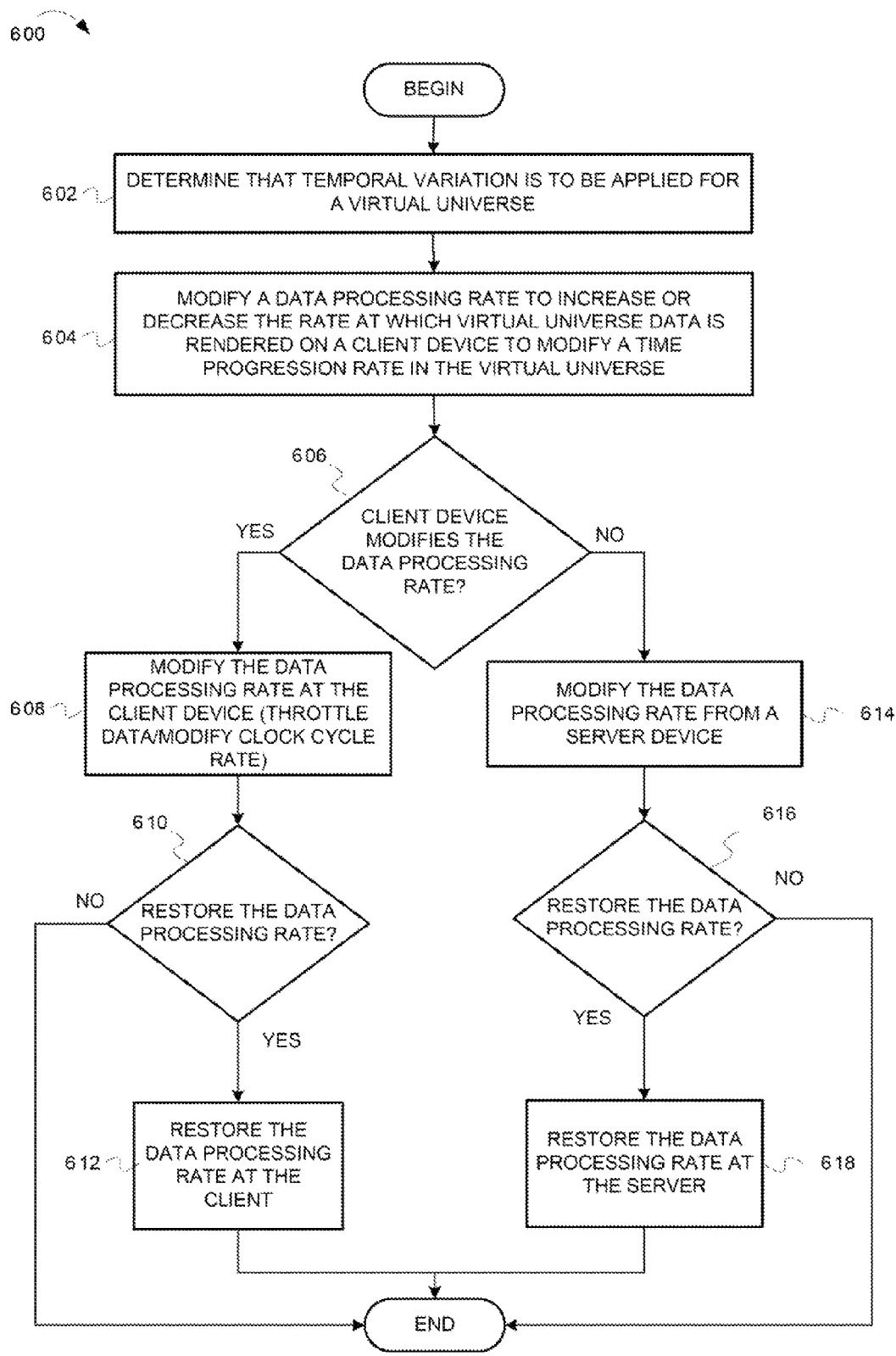
FIG. 6 is an example flow diagram 600 illustrating modifying time progression rates in a virtual universe by modifying data processing rates.

FIG. 6 is an example flow diagram illustrating modifying time progression rates in a virtual universe by modifying data processing rates. In FIG. 6, the flow 600 begins at processing block 602, where a temporal variation device determines that temporal variation is to be applied for a virtual universe.

The flow 600 continues at processing block 604, where the temporal variation device modifies a data processing rate to increase or decrease the rate at which virtual universe data is rendered on a client device. A client device renders data to display actions in the virtual universe. Therefore, the rate at which virtual universe data is rendered on the client can effectively modify the perception of the progression of time in the virtual universe.

The flow 600 continues at processing block 606, where the temporal variation device determines whether a client device, or some other device, modifies the data processing rate. Although the client device renders the data to display action in the virtual universe, the client, and other devices, can prepare and present the data at processing rates that affect the rate at which the client renders the data. If a client device modifies the data processing rate, then the process continues at block 608. Otherwise, the process continues at block 614.

The flow 600 continues at processing block 608, where the temporal variation device modifies the data processing rate at the client device. The temporal variation device can modify the data processing rate at the client. For example, the temporal variation device could throttle data at the client before delivering the data to data rendering components (e.g. video card, processor(s), video cards, etc.) The temporal variation device could also modify the clock cycle rate to cause data to be processed according to a slower or faster computer processing rate. Thus, the affect could cause the data rendering components to render the data at a slower or faster rate.

The flow 600 continues at processing block 610, where the temporal variation device determines whether the data processing should be restored. If the data processing rate will not be restored, then the process can end. Otherwise, the process can continue at processing block 612.

The flow 600 continues at processing block 612, where the temporal variation device restores the data processing rate at the client. The temporal variation device can cause the client to reverse the modifying described in processing block 608. For example, the client can stop throttling data or return client clock cycles to the original cycling rate. Returning to processing block 606, if the client does not modify the data processing rate at processing block 606, then the process continues at processing block 614.

The flow 600 continues at processing block 614, where the temporal variation device modifies the data processing rate from a server device. The temporal variation device can cause a server, or other network device, to modify the data processing rate. For example, the temporal variation device could cause the server to modify a data supply rate to the client. By modifying the data supply rate, the temporal variation device can deliver data to the client at a faster or slower rate than normal. Thus, the affect could cause the client to render data slower or faster The flow 600 continues at processing block 616, where the temporal variation device determines whether the data processing should be restored. If the data processing rate will not be restored, then the process can end. Otherwise, the process can continue at processing block 618.

The flow 600 continues at processing block 6118, where the temporal variation device restores the data processing rate at the client. The temporal variation device can cause the server to reverse the modifying described in processing block 608. For example, the server can stop throttling data or return data transfer rates to the original rate.

Figure 7:
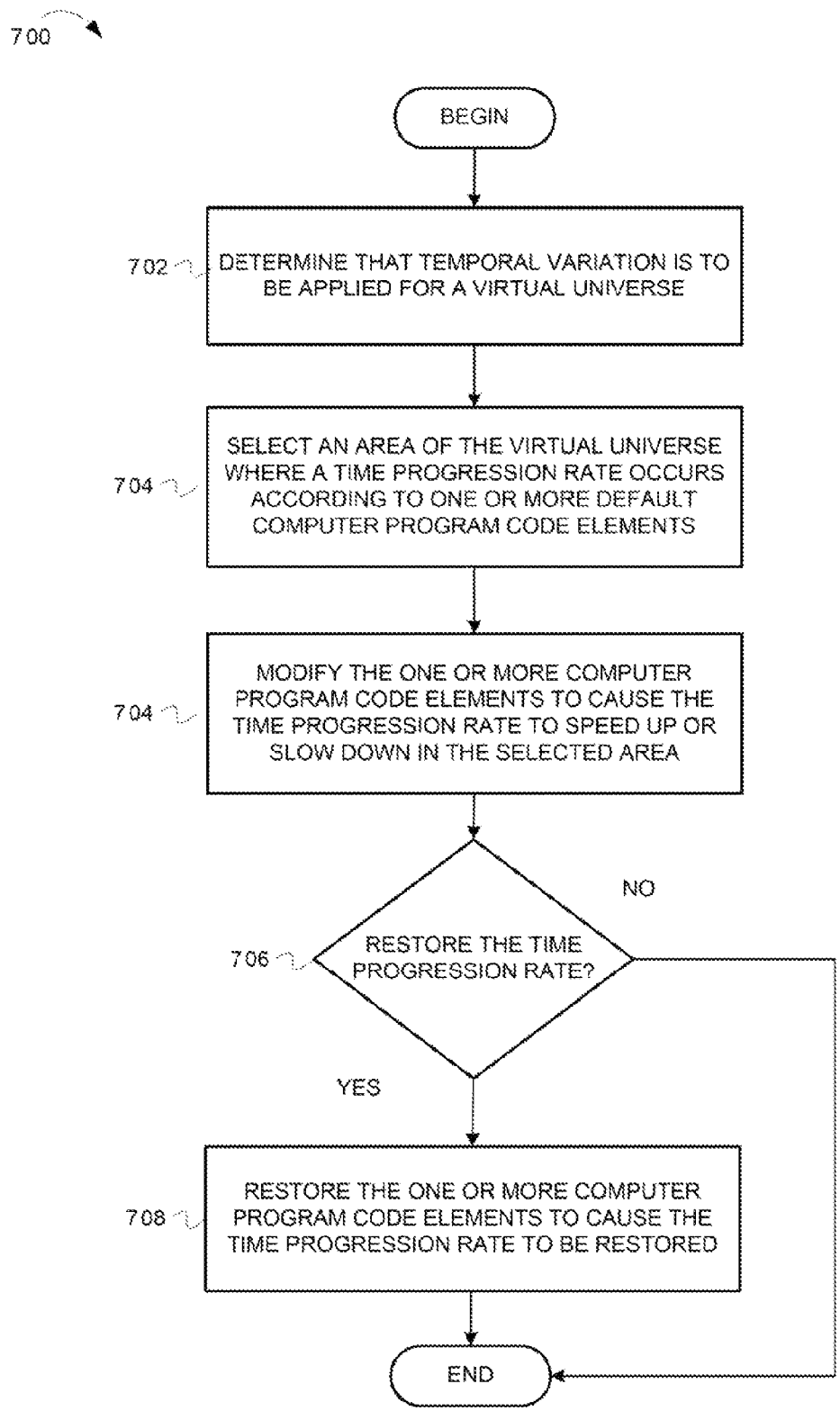
FIG. 7 is an example flow diagram 700 illustrating modifying time progression rates by modifying program code elements.

FIG. 7 is an example flow diagram illustrating modifying time progression rates by modifying program code elements In FIG. 7, the flow 700 begins at processing block 702, where a temporal variation device determines that temporal variation is to be applied for a virtual universe.

The flow 700 continues at processing block 704, where the temporal variation device selects an area of the virtual universe where a time progression rate occurs according to one or more computer program code elements. Program code elements can include variables, formulas, or any other kind of computer programming that can affect algorithms that determine time progression in a virtual universe.

The flow 700 continues at processing block 706, where the temporal variation device modifies the one or more computer program code elements to cause the time progression rate to speed up or slow down in the selected area. These program code elements, for example, might include programming elements that relate directly to a time calculation or to a time itself as a variable. One such example is the formula for speed, or velocity, of objects within the area. The formula for determining velocity includes time as a variable in equation (e.g., velocity=distance/time). If the temporal variation device modifies the progression of time, then the equation for determining velocity will be directly affected. Some additional programming code elements that relate directly to time as a variable include formulas for determining frequency, acceleration, and gravity.

On the other hand, the temporal variation device can also modify programming, elements that do not relate directly to time, but that can, effectively, cause rates of action to change in the area, such as the formula for calculating the viscosity of air in the virtual universe. The temporal variation device could modify the formula, functions, constants, etc. that determine the viscosity of air in the area of the virtual universe, thus causing items to move more slowly or more quickly in the area. Therefore, the temporal variation device can modify the time progression rate by modifying the actions that give the perception of the progression of time. Other programming elements not directly related to time but that can give the perception of the progression of time include formula, functions, constants, etc. for mass, friction, and density.

The flow 700 continues at processing block 708, where the temporal variation device determines whether to restore the time progression rate. If th,e temporal variation device does not restore the time progression rate, the process ends. On the other hand, if the temporal variation device does determine to restore the time progression rate, then the process continues at processing block 708.

The flow 700 continues at processing block 710, where the temporal variation device restores the one or more computer program code elements to cause the time progression rate to be restored. In other words, the temporal variation device stops applying the modified program code elements and applies the program code elements from before the modification. This ensures that the rate of progression of time returns to the value that it was before the modifying described in block 704.

Figure 8:
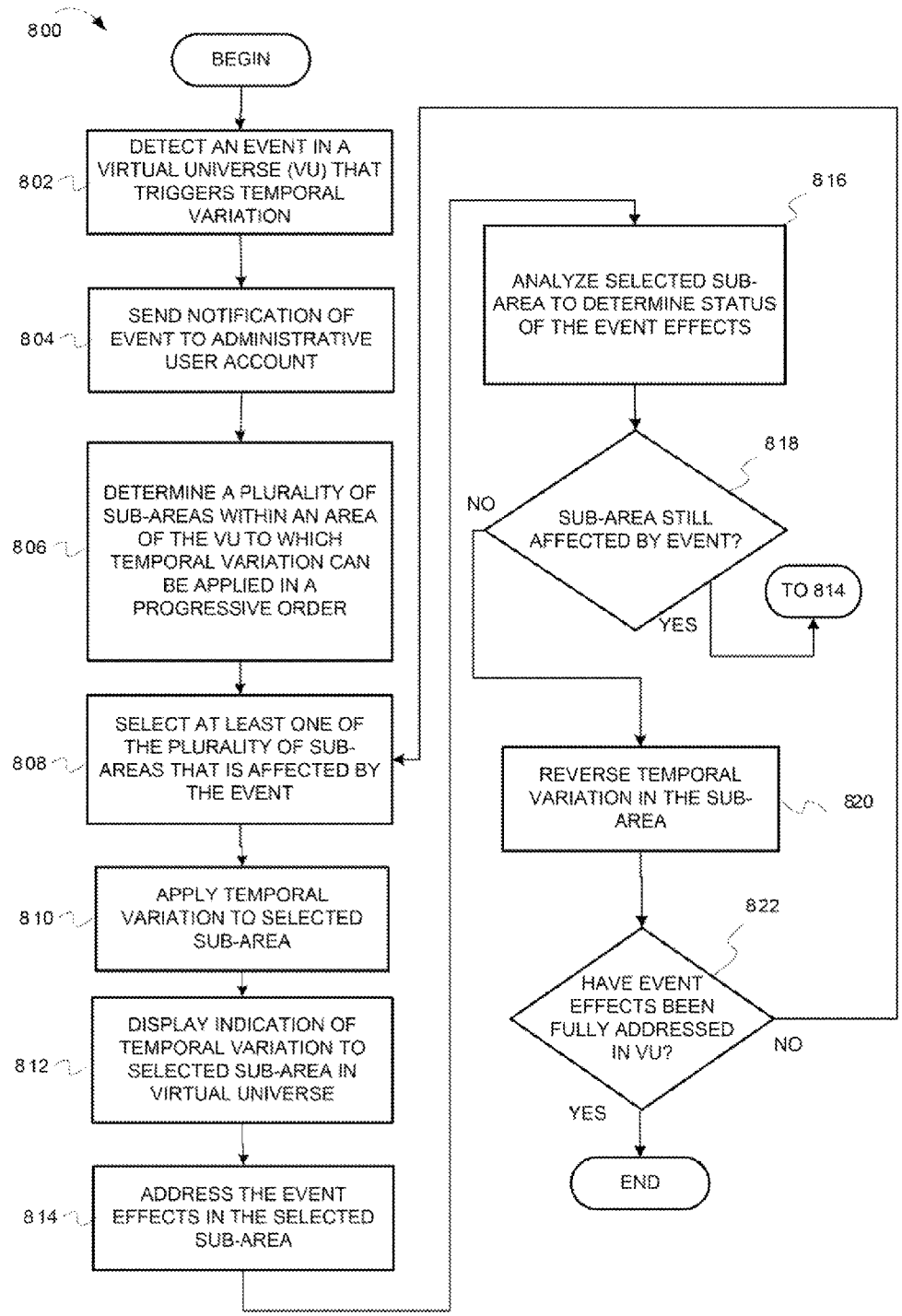
FIG. 8 is an example flow diagram 800 illustrating applying temporal variation in a virtual universe.

FIG. 8 is an example flow diagram illustrating applying temporal variation in a virtual universe. In FIG. 8, the flow 800 begins at processing block 802, where a temporal variation device detects an event in a virtual universe that intentionally triggers temporal variation. An event can be any activity in the virtual universe, either manually initiated or automatically generated, hat indicates, according to temporal variation rules or settings, that temporal variation is required. For example, an event could be a malicious attack on the virtual universe. The temporal variation device can detect the malicious attack and determine that specific areas need to undergo temporal variation to slow down the effects of the attack. On the other hand, the event could be something desirable, like a money transaction conducted by a virtual universe user. If an inexperienced player is conducting the transaction, the temporal variation device could determine that the inexperienced player requires some additional time to conduct the transaction so that the transaction is completed properly. Hence, the temporal variation device can detect that temporal variation should be applied to the area where the financial transaction occurs. The inexperienced player could also manually initiate temporal variation, thus manually indicating a desire to apply temporal variation to the area where the transaction occurs.

The flow 800 continues at processing block 804, where the temporal variation device sends a notification message of the event to an administrative account. The temporal variation device can send a message to notify an administrator of the event The administrator may need to perform specific actions to address the event or specific effects of the event.

The flow 800 continues at processing block 806, where the temporal variation device determines a plurality of sub-areas with in an area of the virtual universe to which temporal variation can be applied in a progressive order. Sub-areas can include sub-area boundaries that can encompass anything in the virtual universe, ranging from entire regions of a virtual universe to smaller areas, specific objects, or locations where a transaction is occurring. The temporal variation device can determine the sub-areas according to a progressive order. In other words, the temporal variation device can determine which sub-areas might be the most affected by the event, which sub-areas might have the most activity that could be interrupted by temporal variation, or which areas might be the most highly-populated areas by inhabitants of the virtual universe, and hence determine to apply temporal variation to those sub-area, first, last, or in another logical order that is minimally intrusive to inhabitants or that is maximally effective for the health of the system. For example, if the event is a detrimental event that could affect the performance of the system, the temporal variation device may decide that the best progressive order is to apply temporal variation, to areas that are most highly populated at the time. Temoporal variation may be applied in this progressive order because the event effects would affect the most number of users. Other less populated areas, however, would be addressed after the highly populated areas.

The flow 800 continues at processing block 808, where the temporal variation device progressively selects at least one of the plurality of sub-areas or objects that is affected by the event.

The flow 800 continues at processing block 810, where the temporal variation device applies temporal variation to the selected sub-area. In other words, the temporal variation device modifies the rate of progression of time within the selected sub-area.

The flow 800 continues at processing block 812, where the temporal variation device displays a visual indicator of temporal variation to the selected sub-area in the virtual universe. The temporal variation device can display an indicator, such as a haze, a color, or some other visual indication to the sub-area that is temporally varied.

The flow 800 continues at processing block 814, where the temporal variation device addresses the event effects in the selected sub-area. For example, if the effects of the event are detrimental, such as system problems or instability, the temporal variation device can fix the problems, or detect that problems have been fixed by a network user or administrator. On the other hand, if the effects of the event are beneficial, such as the conducting of financial transactions in the sub-area, then the temporal variation device can monitor the transaction to determine when the event is completed.

The flow 800 continues at processing block 816, where the temporal variation device analyzes the selected sub-area to determine the status of the event effects. The temporal variation device can analyze the actions occurring in the selected sub-area to determine if the event has terminated or if the effects of event are still affecting the sub-area. For example, the temporal variation device can compare metrics of current activity in the sub-area to metrics of activity in the sub-area before the event occurred.

The flow 800 continues at processing block 818, where the temporal variation device determines whether the sub-area is still affected by the event. If the sub-area is still affected by the event, the process can return to processing block 814 to repeat the process blocks 814 and 816 until the sub-area is not longer affected by the event. The process continues at processing block 820.

The flow 800 continues at processing block 820, where the temporal variation device reverses temporal variation in the sub-area. The temporal variation device can return time progression rates to their original rates. The temporal variation device can also reverse, or turn-off, any display indicators of temporal variation in the sub-area.

The flow 800 continues at processing block 822, where the temporal variation device determines whether the event effects have been fully addressed throughout the entire area in the virtual universe. If the event and its effects have terminated throughout the entire area, then the process can end. If, however, there are other sub-areas in the area that are still experiencing the event or its effects, then the process returns to processing block 808 and repeats the processing in the subsequent blocks until the event and its effects have terminated.

Progressively applying temporal variation to sub-areas is one example of gradually applying time variation. In another example, time variation is applied gradually in temporal degrees in addition to or instead of physical degrees. For example, rates of action for an area may be increased to triple the rate of action, but in an incremental manner. As another example, objects may exit temporal variation individually. Assuming rates of actions are slowed for an area of a virtual universe that includes two objects, the rate of action for a first object may be restored to the default rate of action instantly once it is determined that temporal variation should end for the region. The second object may be restored to the default rate of action gradually.

Figure 9:
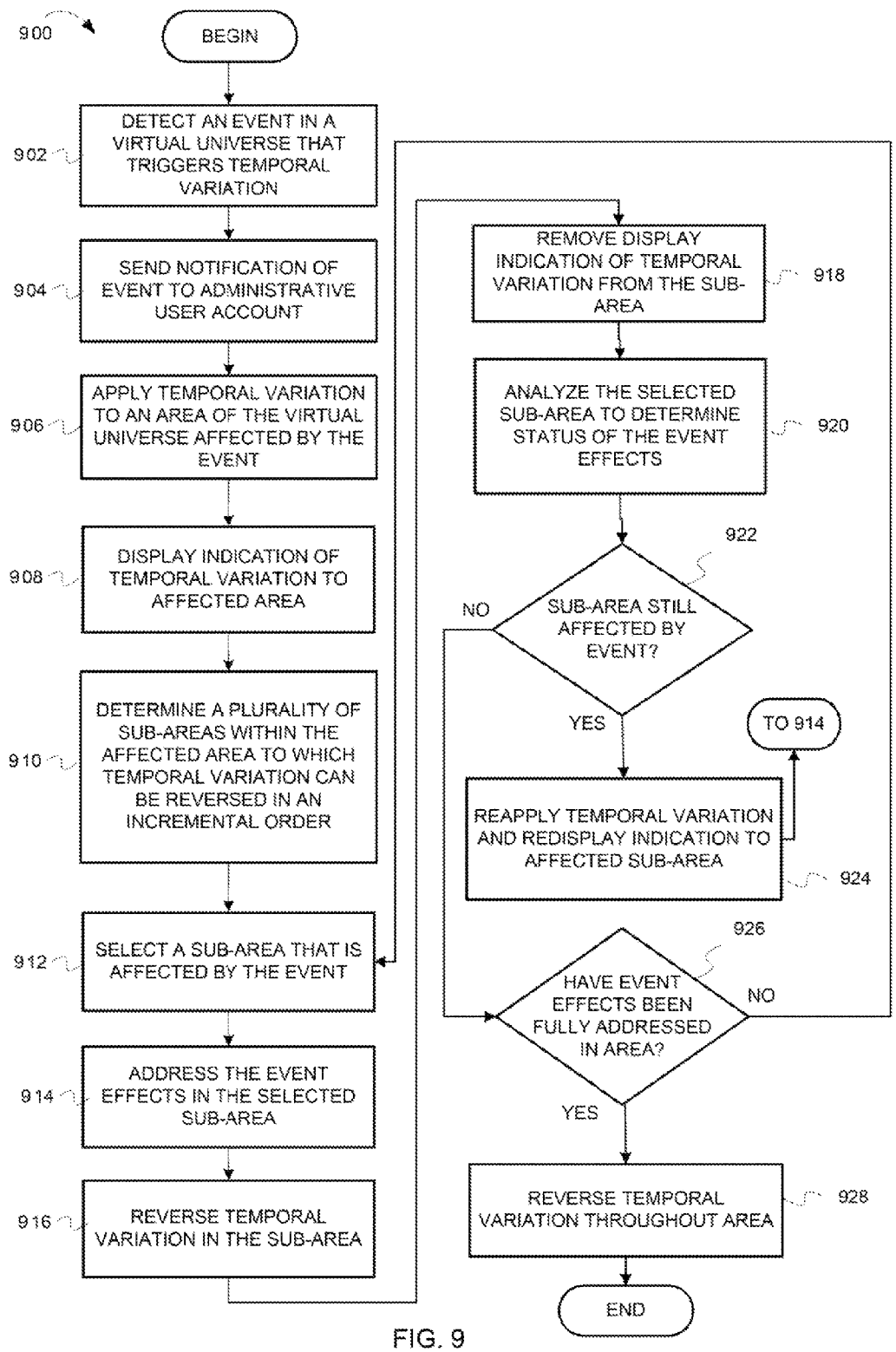
FIG. 9 is an example flow diagram 900 illustrating applying temporal variation in a virtual universe.

FIG. 9 is an example flow diagram illustrating applying temporal variation in a virtual universe. In FIG. 9, the flow 900 begins at processing block 902, where a temporal variation device detects an event in a virtual universe that triggers temporal variation.

The flow 900 continues at processing block 904, where the temporal variation device sends notification of the event to an administrative account. The temporal variation device can send a message to notify an administrator of the event. The administrative may need to perform specific actions to address the event or specific affects of the event.

The flow 900 continues at processing block 906, where the temporal variation device applies temporal variation to an area of the virtual universe affected by the event.

The flow 900 continues at processing block 908, where the temporal variation device displays a visual indicator that temporal variation has been applied to the affected area. The temporal variation device can display an indicator, such as a haze, a color, or some other visual indication to the sub-area that is temporally varied.

The flow 900 continues at processing block 910, where the temporal variation device determines a plurality of sub-areas within the affected area to which temporal variation can be reversed in an incremental or gradual order. The temporal variation device can determine the sub-areas according to an incremental or gradual order, as described in FIG. 8 above.

The flow 900 continues at processing block 912, where the temporal variation device selects a sub-area that is affected by the event.

The flow 900 continues at processing block 914, where the temporal variation device addresses the event effects in the selected sub-area.

The flow 900 continues at processing block 916, where the temporal variation device reverses temporal variation in the sub-area. The temporal variation device removes temporal variation from the area because the effects of the event have been addressed. Removal of the temporal variation allows activities to return to their original rates as quickly as possible.

The flow 900 continues at processing block 918 where the temporal variation device removes the display indicator of temporal variation from the sub-area.

The flow 900 continues at processing block 920, where the temporal variation device analyzes the selected sub-area to determine the status of the event effects. The temporal variation device can analyze the actions occurring in the selected sub-area to determine if the event has terminated or if the effects of event are still affecting the sub-area. For example, the temporal variation device can compare metrics of current activity in the sub-area to metrics of activity in the sub-area before the event occurred.

The flow 900 continues at processing block 922, where the temporal variation device determines whether the sub-area is still affected by the event. If the sub-area is still affected b,y the event, the process can continue to processing block 924. If, however, the sub-area is not affected by event, then the process can continue to processing block 926.

The flow 900 continues at processing block 924, where the temporal variation device reapplies temporal variation and redisplays the visual indicator to the affected sub-area. The process can then return to processing block 914 and repeat the subsequent processing blocks through block 922 until the sub-area is no longer affected by the event.

The flow 900 continues at processing block 926, where the temporal variation device determines whether the effects of the event have been filly addressed in the area. If the area is still experiencing effects of the event, then the process can return to block 912 to select a different sub-area and apply the subsequent processing blocks to the newly selected sub-area.

The flow 900 continues at processing block 928, where the temporal variation device reverses temporal variation throughout the entire area. Once the temporal variation device determines that the event effects are no longer apparent in any of the sub-areas for the area, then the temporal variation device ensures that temporal variation is reversed, or turned off through the entire area, thus returning the area to its original time progression rates.

In some embodiments, the operations described further above can be performed in series, while in other embodiments, one or more of the operations can be performed in parallel.

Example Temporal Variation Device Network

Figure 10:
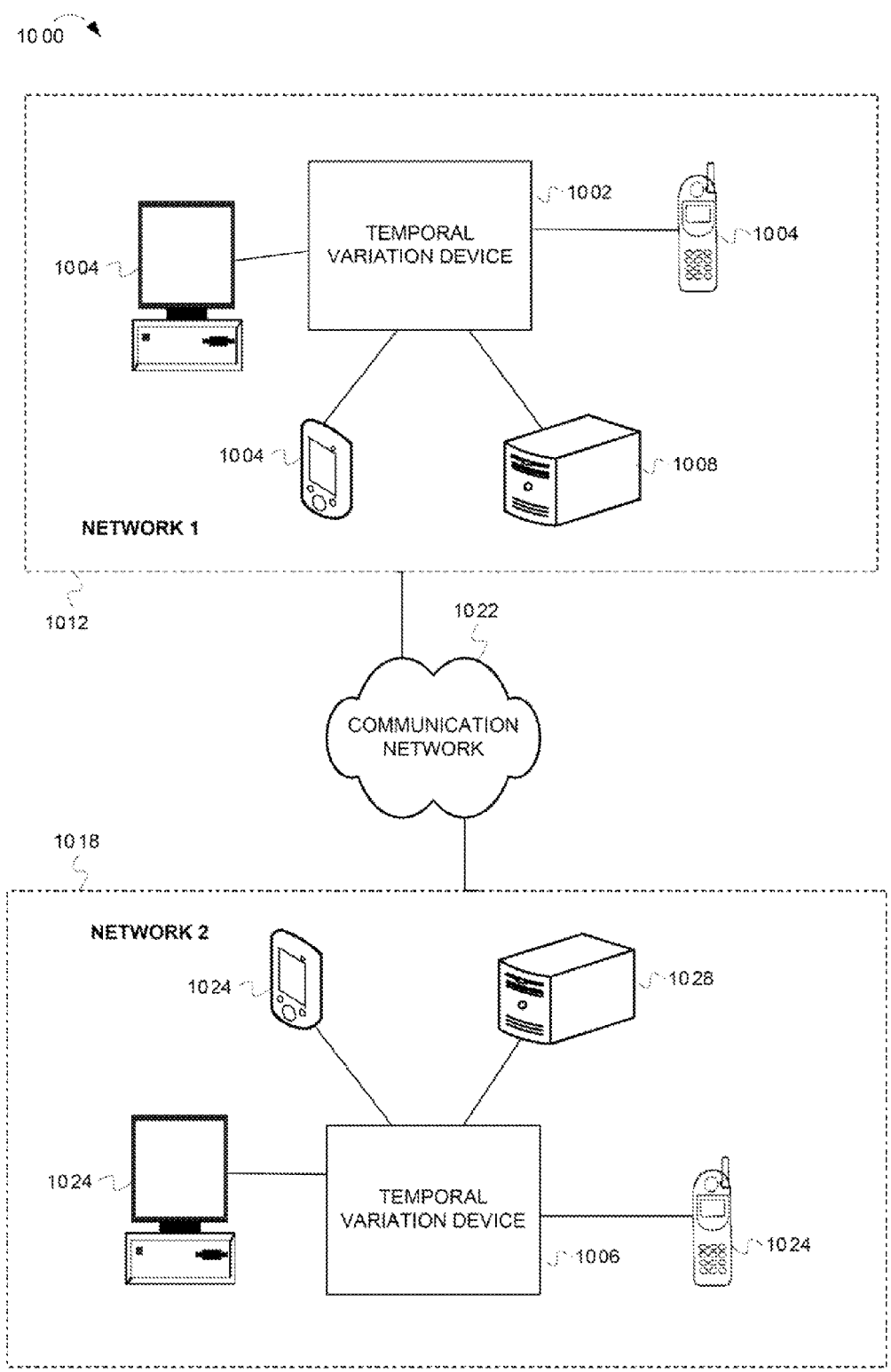
FIG. 10 is an illustration of an example temporal variation device 1002 on a network 1000.

FIG. 10 is an illustration of an example temporal variation device 1002 on a network 1000. In FIG. 10, the network 1000, also referred to as a temporal variation device network 1000, includes a first local network 1012 that includes network devices 1004 and 1008 that can use the temporal variation device 1002. Example network devices 1004 and 1008 can include personal computers, personal digital assistants, mobile telephones, mainframes, minicomputers, laptops, servers, or the like. In FIG. 10, some network devices 1004 can be client devices ("clients") that can work in conjunction with a server device 1008 ("server"). Any one of the network clients 1004 and server 1008 can be embodied as the computer system described in FIG. 11. A communications network 1022 connects a second local network 1018 to the first local network 1012. The second local network 1018 also includes client 1024 and a server 1028 that can use a temporal variation device 1006.

Still referring to FIG. 10, the communications network 1012 can be a local area network (LAN) or a wide area network (WAN). The communications network 1012 can include any suitable technology, such as Public Switched Telephone Network (PSTN), Ethernet, 802.11g, SONET, etc. For simplicity, the temporal variation device network 1000 shows only six clients 1004, 1024 and two servers 1008, 1028 connected to the communications network 1022. In practice, there way be a different number of clients and servers. Also, in some instances, a device may perform the functions of both a client and a server. Additionally, the clients 1004, 1024 can connect to the communications network 1022 and exchange data with other devices in their respective networks 1012, 1018 or other networks (not shown).

Example Temporal Variation Device Computer System

Figure 11:
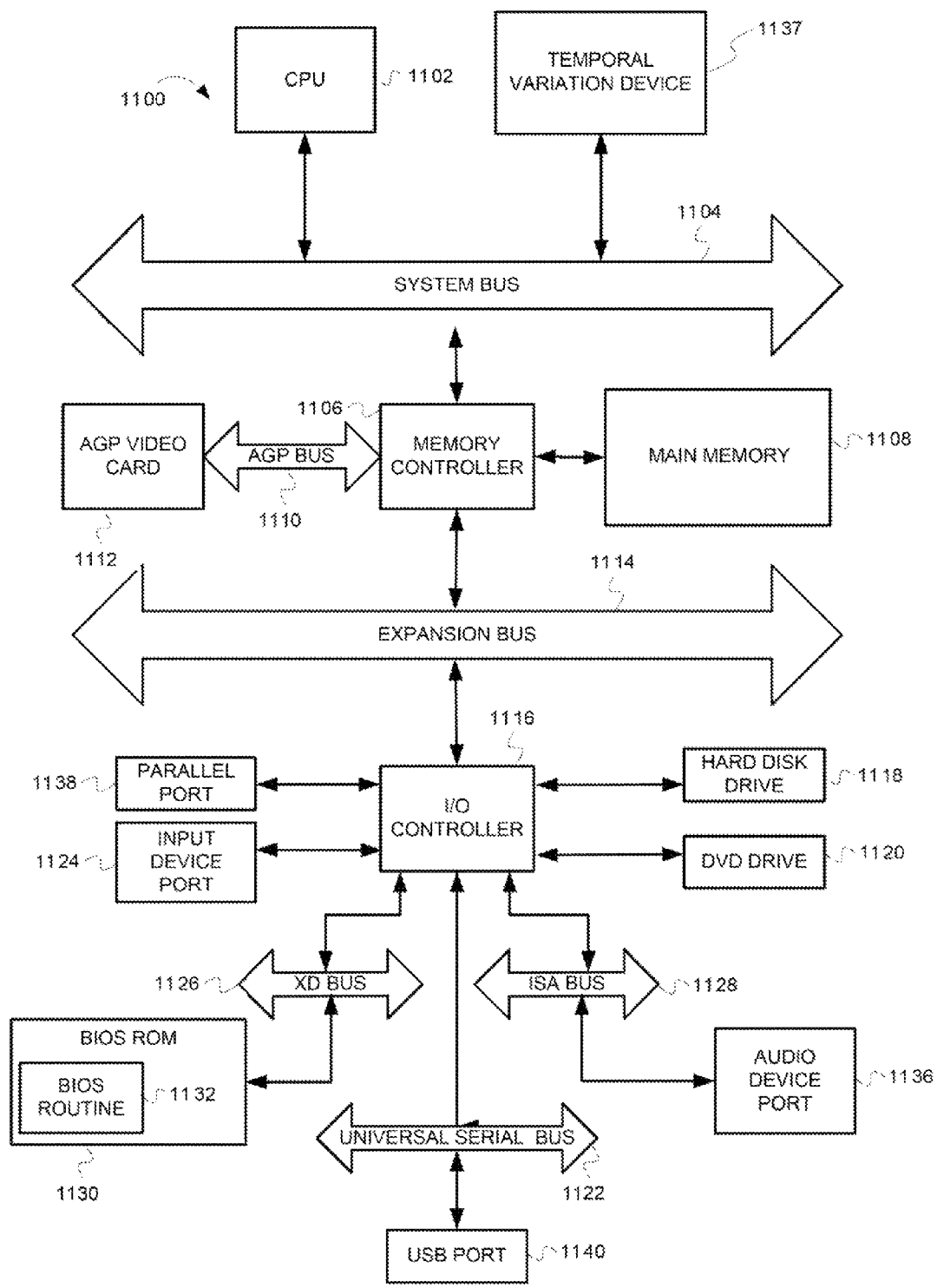
FIG. 11 is an illustration of an example temporal variation device computer system 1100.

FIG. 11 is an illustration of an example temporal variation device computer system 1100. In FIG. 11, the temporal variation device 1100 ("computer system") includes a CPU 1102 connected to a system bus 1104. The system bus 1104 is connected to a memory controller 1106 (also called a north bridge), which is connected to a main memory unit 1108, AGP bus 1110 and AGP video card 1112. The main memory unit 1108 can include any suitable memory random access memory (RAM), such as synchronous dynamic RAM, extended data output RAM, etc.

In one embodiment, the computer system 1100 includes a temporal variation device 1137. The temporal variation device 1137 can process communications, commands, or other information, where the processing can control relative time progression rates in a virtual universe. The temporal variation device 1137 is shown connected to the system bus 1104, however the temporal variation device 1137 could be connected to a different bus or device within the computer system 1100. The temporal variation device 1137 can include software modules that utilize main memory 1108.

An expansion buss 1114 connects the memory controller 1106 to an input/output (I/O) controller 1116 (also called a south bridge). According to embodiments, the expansion bus 1114 can be include a peripheral component interconnect (PCI) bus, PCIX bus, PC Card bus, CardBus bus, InfiniBand bus, or an industry standard architecture (ISA) bus, etc.

The I/O controller is connected to a hard disk drive (HDD) 1118, digital versatile disk (DVD) 1120, input device ports 1124 (e.g., keyboard port, mouse port, and joystick port), parallel port 1138, and a universal serial bus (USB) 1122. The USB 1122 is connected to a USB port 1140. The I/O controller 1116 is also connected to an XD bus 1126 and an ISA bus 1128. The ISA bus 1128 is connected to an audio device port 1136, while the XD bus 1126 is connected to BIOS read only memory (ROM) 1130.

In some embodiments, the computer system 1100 can include additional peripheral devices and/or more than one of each component shown in FIG. 11. For example, in some embodiments, the computer system 1100 can include multiple external multiple CPUs 1102. In some embodiments, any of the components can be integrated or subdivided.

Any component of the computer system 1100 can be implemented as hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions in a form that is not a propagated signal. A machine readable signal medium may include embodiments in an electrical, optical, acoustical or other form of propagated signal (e.g., carrier waves, infrared signals, digital signals, etc.).

GENERAL

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:
selecting an area of a virtual universe, wherein time progresses at a first time progression rate in the area; and
modifying the first time progression rate for the area to a second time progression rate different from the first time progression rate,
wherein said modifying comprises changing an effect of physical rules in the area, which causes objects in the area to act in accordance with the second time progression rate.

2. The method of claim 1, wherein said modifying the first time progression rate comprises modifying a rate at which data is processed to present the virtual universe.

3. The method of claim 1, wherein said modifying comprises modifying one or more computer code program elements for the area that affect one or more of movement, velocity, distance, frequency, acceleration, viscosity of air, gravity, mass, and friction.

4. The method of claim 1, further comprising:
detecting an event that affects a stability of the virtual universe, wherein said modifying the first time progression rate in the area to the second time progression rate is in response to said detecting of the event that affects the stability of the virtual universe.

5. The method of claim 1, wherein said modifying the first time progression rate in the area to the second time progression rate comprises:
forming a boundary around a radius of an avatar, wherein a second area is outside of the boundary, and wherein actions occur in the second area according to the first time progression rate.

6. The method of claim 1 further comprising:
identifying that an avatar performs a harmful activity within in the virtual universe, and wherein said selecting the area of the virtual universe is in response to the identifying that the avatar performs the harmful activity.

7. The method of claim 1 further comprising:
detecting an event that occurs in the virtual universe that affects a stability of the virtual universe;
analyzing a potential impact of the event on the virtual universe; and
determining, based on the analyzing of the potential impact of the event on the virtual universe, that the potential impact will affect the area more than a second area in the virtual universe, and wherein said selecting the area of the virtual universe is in response to determining that the potential impact will affect the area more than the second area.

8. The method of claim 1 further comprising:
detecting that an avatar enters the area from an additional area of the virtual universe, wherein the virtual universe includes a first set of physical rules that govern physics in the virtual universe, and wherein changing the effect of the physical rules in the area comprises changing the first set of physical rules to a second set of physical rules;
applying the second set of physical rules to the avatar while in the area, wherein the second set of physical rules causes the avatar to move in the area in accordance with the second time progression rate;
detecting that the avatar exits the area and enters the additional area; and
applying the first set of physical rules to the avatar while in the additional area, wherein the first set of physical rules causes the avatar to move in the additional area in accordance with the first time progression rate.

9. The method of claim 1 further comprising:
visually modifying an appearance of one or more of a geographic characteristic and an atmospheric characteristic of the area in response to the modifying of the first time progression rate in the area to the second time progression rate.

10. The method of claim 1 further comprising:
    detecting that an avatar is performing an activity within the area,
    determining that the avatar is inexperienced at performing the activity,
    modifying the first time progression rate in the area to the second time progression rate to slow an occurrence of the activity within the area in response to the determining that the avatar is inexperienced at performing the activity.

11. A method comprising:
    determining that an avatar -performs a first activity at a first rate of movement within an area in a virtual universe;
    detecting a client, associated with the avatar, wherein the client renders an appearance of the avatar at the first rate of movement according to a data processing rate;
    instructing the client to modify the data processing rate, wherein the modifying of the data processing rate causes the -avatar to slow down performance of the first activity within the area from the first rate of movement to a second rate of movement; and
    performing a second activity at the first rate of movement while the avatar performs the first activity at the second rate of movement, wherein the second activity counteracts the first activity.

12. The method of claim 11, wherein said instructing the client to modify the data processing rate comprises instructing the client to modify a clock cycle rate for rendering the virtual universe.

13. The method of claim 11, wherein said instructing the client to modify the data processing rate comprises instructing the client to throttle data for rendering the virtual universe.

14. The method of claim 11, wherein said performing of the second activity comprises causing an additional avatar to perform the second activity.

15. A system comprising:
    a machine configured to connect to a communication network, the machine configured to process data in a virtual universe;
    a temporal variation device configured to connect to any one of the machine and the communication network, wherein the temporal variation device comprises a temporal variation controller configured to
        determine a first area of the virtual universe, wherein time progresses at a first time progression rate in the virtual universe, and
        modify the first time progression rate in the first area to a second time progression rate different than the first time progression rate, wherein said modification causes actions in the first area to occur in accordance with the second time progression rate while actions occur in a second area of the virtual universe in accordance with the first time progression rate;
    a temporal variation effects monitoring device configured to analyze the effects of said modification of the first time progression rate; and
    a temporal variation display controller configured to display an indicator, viewable via the machine, of said modification of the first time progression rate.

16. The system of claim 15 further comprising:
    an event detector configured to detect an event that triggers said modification of the first time progression rate.

17. The system of claim 15, wherein the temporal variation controller is configured to modify the first time progression rate in the first area to the second time progression rate by being configured to modify one or more variables that control one or more of viscosity of air, gravity, mass, and friction in the first area.

18. The system of claim 15, wherein said machine is configured to render the virtual universe at a data processing rate, and wherein said temporal variation device is configured to modify the first time progression rate by modifying the data processing rate.

19. The system of claim 18, wherein said data processing rate comprises any one of a data transfer rate, a data throttling rate, and a computer clock cycle rate.

20. A computer program product comprising a machine-readable, tangible storage device(s) and machine-readable program instructions stored on the machine-readable, tangible storage device(s) to modify time progression, the machine-readable program instructions, when executed by a CPU:
    detect an event that occurs in a virtual universe;
    analyze a potential impact of the event on the virtual universe;
    determine, based on the analyzing of the potential impact of the event on the virtual universe, that the potential impact will affect a first area of the virtual universe more than a second area of the virtual universe, wherein time progresses at a first time progression rate in both the first area and in the second area the virtual universe; and
    modify the first time progression rate in the first area to a second time progression rate different from the first time progression rate, wherein said modifying causes actions in the first area to occur in accordance with the second time progression rate while simultaneously actions occur in a second area of the virtual universe in accordance with the first time progression rate.

21. The computer program product of claim 20 further comprising machine-readable program instructions which are stored on the machine-readable, tangible storage device(s) and when executed by the CPU modify one or more computer code program variables that affect one or more of viscosity of air in the first area, gravity in the first area, mass in the first area, and friction in the first area.

22. The computer program product of claim 20 further comprising machine-readable program instructions which are stored on the machine-readable, tangible storage device(s) and when executed by the CPU:
    automatically address an effect caused by the event on a stability of the first area;
    reset the second time progression rate in the first area to the first time progression rate after automatically addressing the effect caused by the event on the stability of the first area; and
    modify the first time progression rate in the second area to the second time progression rate after resetting the second time progression rate in the first area to the first time progression rate.

23. The computer program product of claim 20 further comprising machine-readable program instructions which are stored on the machine-readable, tangible storage device(s) and when executed by the CPU:
    reverse at least some effects of the event on the first area while the first area is subject to the second time progression rate;
    compare first metrics of a first state of the first area before the event to second metrics of a second state of the first area after reversing the at least some effects of the event;
    determine, based on the comparing of the first metrics to the second metrics, that the reversing of the at least some effects improves a stability of the first area; and reset the second time progression rate in the first area to the first time progression rate in response to determining that the reversing of the at least some effects improves the stability of the first area.

24. The computer program product of claim 20 further comprising machine-readable program instructions which are stored on the machine-readable, tangible storage device(s) and when executed by the CPU:

analyze an impact to an avatar population of the first area.

25. The computer program product of claim 20 further comprising machine-readable program instructions which are stored on the machine-readable, tangible storage device(s) and when executed by the CPU:

modify one or more of a visual geographic characteristic and a visual atmospheric characteristic of the first area in response to modifying the first time progression rate in the first area to the second time progression rate.

* * * * *